United States Patent
Tsirkin et al.

(10) Patent No.: US 10,810,137 B2
(45) Date of Patent: Oct. 20, 2020

(54) PHYSICAL ADDRESS RANDOMIZATION FOR SECURE ENCRYPTED MEMORY

(71) Applicant: RED HAT, INC.

(72) Inventors: Michael Tsirkin, Lexington, MA (US); Paolo Bonzini, Turate (IT)

(73) Assignee: Red Hat, Inc., Raleigh, NC (US)

( * ) Notice: Subject to any disclaimer, the term of this patent is extended or adjusted under 35 U.S.C. 154(b) by 158 days.

(21) Appl. No.: 15/443,745

(22) Filed: Feb. 27, 2017

(65) Prior Publication Data

US 2018/0246818 A1    Aug. 30, 2018

(51) Int. Cl.
| G06F 21/00 | (2013.01) |
| G06F 12/14 | (2006.01) |
| G06F 9/455 | (2018.01) |
| G06F 12/08 | (2016.01) |
| G06F 12/06 | (2006.01) |

(52) U.S. Cl.
CPC ...... *G06F 12/1408* (2013.01); *G06F 9/45558* (2013.01); *G06F 12/08* (2013.01); *G06F 12/0607* (2013.01); *G06F 2009/45583* (2013.01); *G06F 2212/1041* (2013.01); *G06F 2212/1052* (2013.01); *G06F 2212/151* (2013.01)

(58) Field of Classification Search
CPC .. G06F 12/1408; G06F 12/08; G06F 9/45558; G06F 12/0607; G06F 2009/45587; G06F 2212/402; G06F 2212/152; G06F 2212/151; G06F 2212/1052; G06F 2212/1041; G06F 2009/45583
See application file for complete search history.

(56) References Cited

U.S. PATENT DOCUMENTS

| 6,477,612 | B1 * | 11/2002 | Wang | G06F 12/1009 |
| | | | | 711/2 |
| 8,756,383 | B2 | 6/2014 | Tsirkin | |
| 8,949,569 | B2 * | 2/2015 | Benner | G06F 9/3824 |
| | | | | 711/118 |

(Continued)

FOREIGN PATENT DOCUMENTS

WO    2012099945 A1    7/2012

OTHER PUBLICATIONS

Merwyn, "Steps for handling page fault" (https://professormerwyn.wordpress.com/2015/10/16/steps-for-handling-page-fault/), Oct. 16, 2015, 2 pages (Year: 2015).*

(Continued)

*Primary Examiner* — Chau Le
*Assistant Examiner* — Han Yang
(74) *Attorney, Agent, or Firm* — Lowenstein Sandler LLP (57) ABSTRACT

An operating system (OS) receives a request to allocate a physical memory page to an address space of an application. The OS maintains a data structure that stores references to a plurality of physical memory pages that are available to be allocated, and generates a random index into the data structure, wherein the random index comprises a random number, and wherein the random index corresponds to a first reference for a first physical memory page of the plurality of physical memory pages. The OS selects the first physical memory page of the plurality of memory pages from the data structure using the random index, and maps the first physical memory page to the address space of the application.

20 Claims, 6 Drawing Sheets

(56) References Cited

U.S. PATENT DOCUMENTS

| | | | | |
|---|---|---|---|---|
| 2004/0078631 A1* | 4/2004 | Rogers | ............... | G06F 12/08 |
| | | | | 714/5.11 |
| 2007/0214340 A1* | 9/2007 | Leveille | ............... | G06F 9/52 |
| | | | | 711/203 |
| 2007/0234296 A1* | 10/2007 | Zorn | ............... | G06F 11/008 |
| | | | | 717/124 |
| 2013/0117331 A1* | 5/2013 | Schreter | ............ | G06F 9/5083 |
| | | | | 707/803 |
| 2013/0145177 A1* | 6/2013 | Cordella | .......... | G06F 12/1408 |
| | | | | 713/193 |
| 2014/0195767 A1* | 7/2014 | Colombo | ........... | G06F 9/5016 |
| | | | | 711/170 |
| 2015/0161055 A1 | 6/2015 | Deguillard et al. | | |
| 2015/0261576 A1 | 9/2015 | Gong et al. | | |

OTHER PUBLICATIONS

"Shared memory and distributed memory multiprocessor systems", Lecture XVI. Introduction to parallel systems (ARK-ENG course), 2005, 3 pages (Year: 2005).*

Dan Nanni, "How to find out which CPU core a process is running on", Sep. 2015, 4 pages (Year: 2015).*

ISTIC, "Multi-core real-time scheduling", 2012, 21 pages (Year: 2012).*

* cited by examiner

PHYSICAL ADDRESS RANDOMIZATION FOR SECURE ENCRYPTED MEMORY

TECHNICAL FIELD

The present disclosure is generally related to computer systems, and more particularly, to physical address randomization in computer systems.

BACKGROUND

In computer operating systems, virtual memory is a memory management technique that maps a memory address used by an application program ("virtual address") to a physical location in computer memory ("physical address"). When an application program attempts to access a virtual address that is not in a computer's memory, the access is treated as a page fault, causing the operating system to obtain an available physical page of memory to use for the data. The operating system may maintain a list of physical pages of memory that are available to be allocated to an application program. This is typically referred to as a "free list".

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for physical address randomization for secure encrypted memory. In computer operating systems, when an application requests a virtual address, the operating system provides a physical page for the application to access. In some cases, repeated execution of the same applications on the same computer system may become predictable with respect to the information stored in the physical pages. An application can be monitored on subsequent executions in order to compare the information stored in allocated physical memory pages. A bad actor could identify areas of memory allocated to the application that do not change during subsequent executions of an application in order to derive protected information.

Some operating system implementations attempt to mitigate this problem by randomizing the virtual addresses provided to an application. When an application requests a virtual address, a random offset may be generated by the operating system to provide a different virtual address to the application for each memory request. This, however, may not guarantee that the physical page of memory would also be randomly selected. Additionally, in many conventional implementations, virtual addresses are allocated by the operating system per application. So, even where the virtual address is randomly selected, it is still selected from the pool of virtual addresses in the address space for that allocation. This can also still present a significant level of predictability with respect to the physical page allocated for each virtual address. Further, in implementations where the contents of the physical page are encrypted using an encryption key or initialization vector that incorporates location information (e.g., address information for the physical page), a bad actor may compare the data stored at a particular physical address against data stored at that address during subsequent executions of the same application to derive secret information.

Aspects of the present disclosure address the above noted and other deficiencies by implementing physical address randomization to provide enhanced security for application data. In particular, an operating system may utilize a free list of available physical pages and randomly (or pseudo-randomly) select a physical page from that list when providing a physical page to an application. By doing so, the operating system can randomize physical memory addresses provided to applications across the entire memory space of the computer system rather than only within the virtual memory addresses in the application's memory space. Additionally, by randomly selecting from the free list of available physical pages (rather than randomly generating address offsets), the degree of randomness for memory allocations can be increased since the free list may include physical pages that had been previously allocated to other applications within the system (rather than only within that application's memory space). Thus, aspects of the present disclosure may significantly reduce the predictability of application memory management for subsequent executions of applications, which in turn can dramatically increase security.

In an illustrative example, an operating system (OS) receives a request to allocate a physical memory page to an address space of an application. The OS maintains a data structure that stores references to a plurality of physical memory pages that are available to be allocated, and generates a random index into the data structure, wherein the random index comprises a random number, and wherein the random index corresponds to a first reference for a first physical memory page of the plurality of physical memory pages. The OS selects the first physical memory page of the plurality of memory pages from the data structure using the random index, and maps the first physical memory page to the address space of the application.

Figure 1:
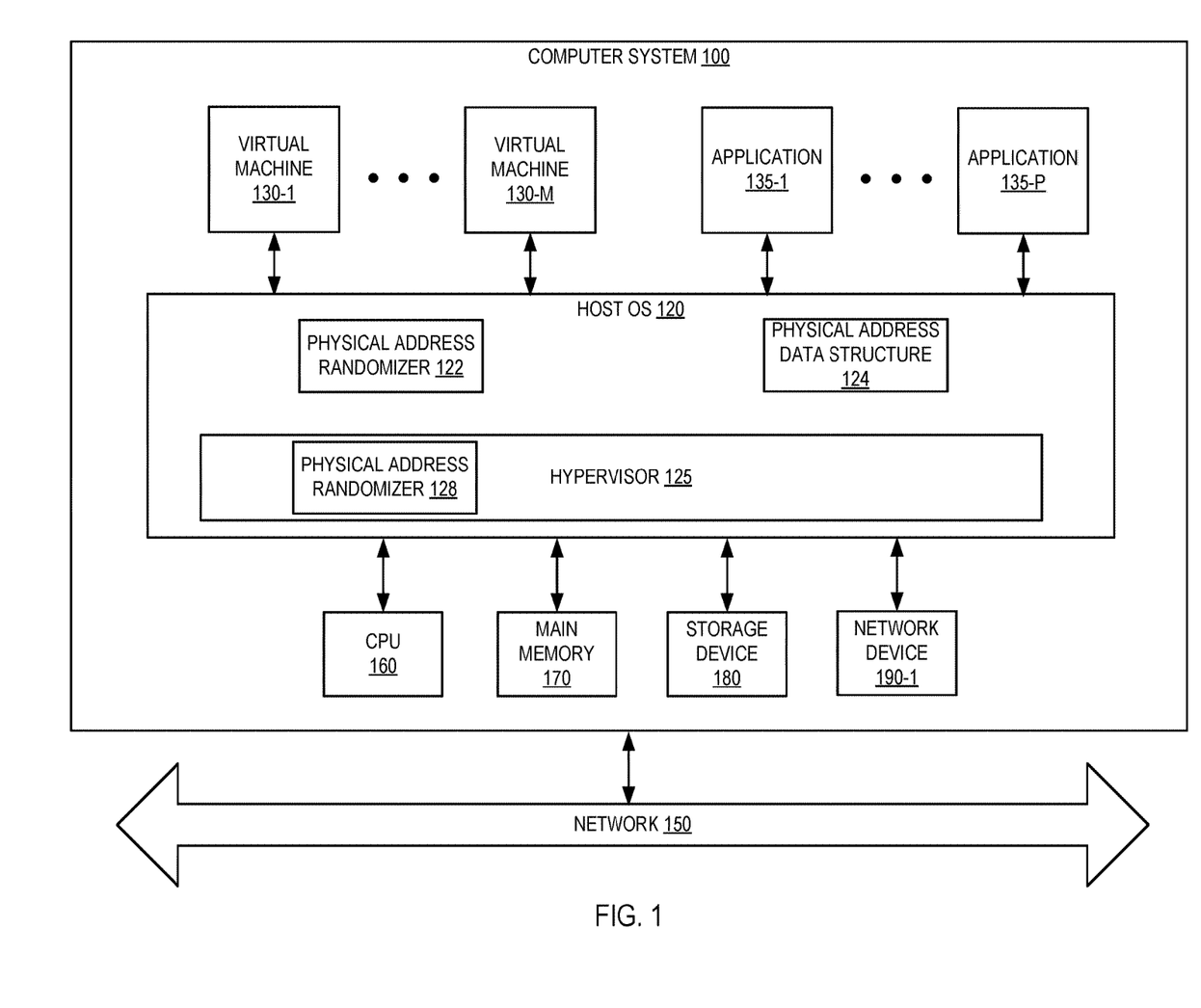
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. Other architectures for computer system 100 are possible, and implementations of a computer system utilizing examples of the present disclosure are not limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Universal Serial Bus [USB] solid state drive, a Redundant Array of Independent Disks [RAID] system, a network attached storage [NAS] array, etc.), and one or more network devices 190-1 through 190-D, where D is a positive integer (e.g., a network interface controller (NIC), an I/O device, a CD/DVD-ROM drive, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more applications 135-1 through 135-P, where P is a positive integer, and a host operating system (OS) 120. Host OS 120 manages the hardware resources of the computer system and provides functions such as inter-process communication, scheduling, memory management, and so forth. Applications 135-1 through 135-P are software applications running on the same CPU. In some implementations, computer system 100 may additionally include one or more virtual machines (VMs) 130-1 through 130-M, where M is a positive integer. VMs 130 are a software implementation of a machine that executes programs as though it were an actual physical machine.

Host OS 120 may include a physical address randomizer 122 as well as a physical address data structure 124. Physical address randomizer 122 may be responsible for facilitating physical address randomization for memory access requests received from applications 135. In an illustrative example, physical address randomizer 122 may receive a request from one of applications 135 to allocate a physical memory page to an address space of the application. In some embodiments, physical address randomizer 122 may detect a page fault that is generated by application 135's attempt to access a virtual memory address that is associated with the address space of the application. Physical address randomizer 122 may then randomly (or pseudo-randomly) select an available physical memory page to map to the address space of application 135.

Host OS 120 may maintain physical address data structure 124 that stores references to multiple physical memory pages that are available to be allocated to any of the applications 135. In some implementations the data structure may be a list of references to available physical memory pages (e.g. a "free list"). The list may be a tabular list, a linked list, or the like. The list may be organized such that each list item has an identifier and includes a reference address location to the corresponding available physical memory page.

Responsive to detecting an attempt by the application 135 to access a virtual memory address associated with the application's memory space, physical address randomizer 122 may then generate a random (or pseudo-random) index into the data structure, where the random index corresponds to a reference for one of the available physical memory pages in the data structure. In an illustrative example, physical address randomizer may generate a random number, and identify the item in the list of available physical memory pages that corresponds to the random number. Physical address randomizer 122 may then map the selected physical memory page to the memory space of application 135. Physical address randomizer 122 is described in further detail below with respect to FIG. 2.

In some implementations, where computer system 100 includes a virtualized environment, host OS 120 may additionally include a hypervisor 125, which provides a virtual operating platform for VMs 130 and manages their execution. Hypervisor 125 may include physical address randomizer 128 that can facilitate physical address randomization for memory access requests received from VMs 130. It should be noted that in some alternative implementations, hypervisor 125 may be external to host OS 120, rather than embedded within host OS 120, or may replace host OS 120. In some implementations, physical address randomizer 128 may perform in a similar manner to that described above with respect to physical address randomizer 122. Notably, physical address randomizer can detect memory access attempts made by VMs 130 rather than applications 135, and subsequently randomly (or pseudo-randomly) select and map an available physical memory page to VM 130 rather than application 135. While FIG. 1 depicts physical address randomizer 122 and physical address randomizer 128 separately, in some implementations a single instance of physical address randomizer (122, 128) may provide physical address randomization for both VMs 130 and applications 135.

Figure 2:
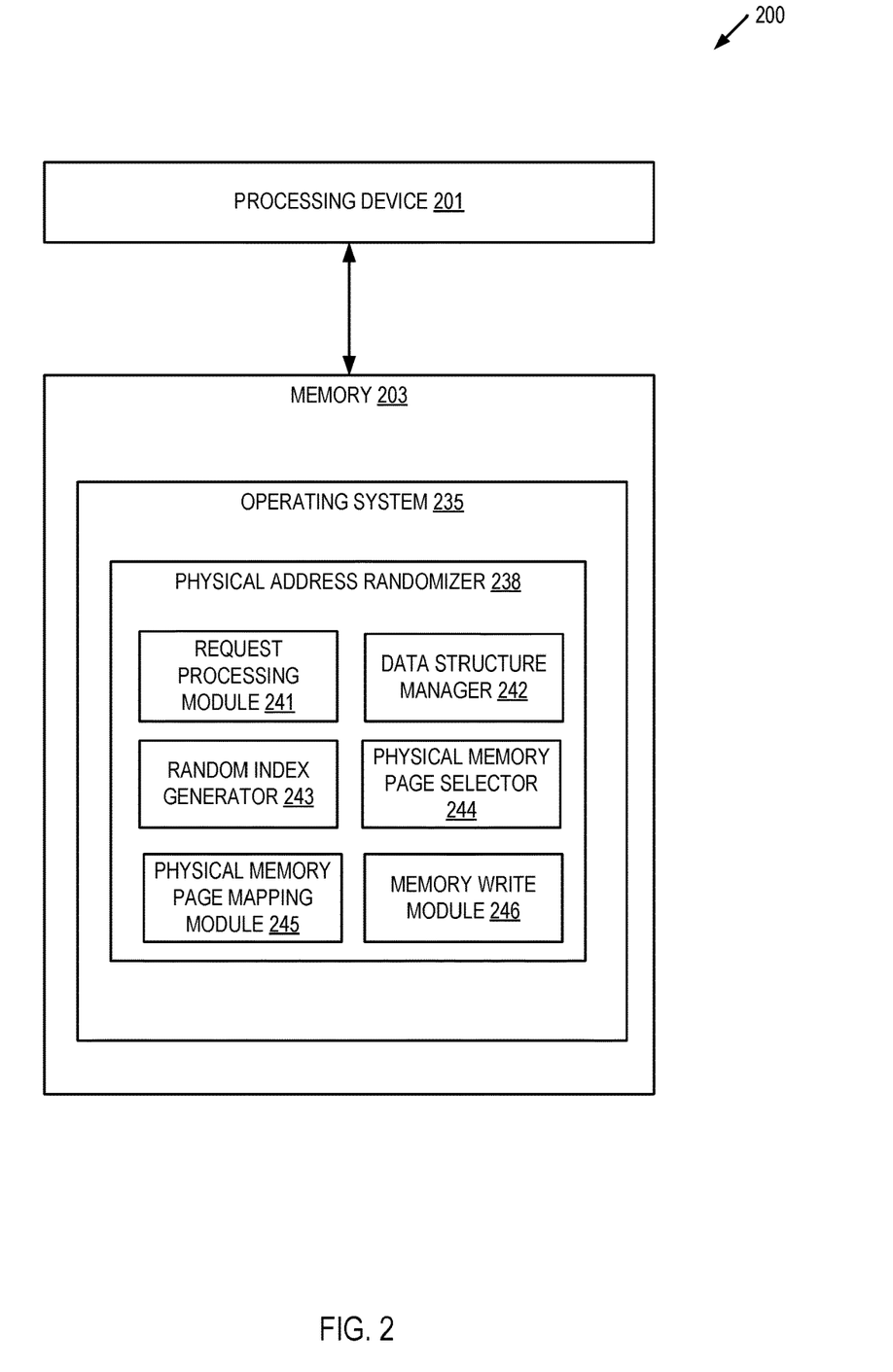
FIG. 2 depicts a block diagram illustrating an example of a physical address randomizer, in accordance with one or more aspects of the present disclosure.

FIG. 2 depicts a block diagram illustrating an example a physical address randomizer 238 for facilitating physical address randomization for memory access requests received from applications and/or virtual machines. In some implementations, physical address randomizer 238 may correspond to physical address randomizer 122 and/or physical address randomizer 128 of FIG. 1. As shown in FIG. 2, physical address randomizer 238 may be a component of a computing apparatus 200 that includes a processing device 201, operatively coupled to a memory 203, to execute an operating system 235. In some implementations operating system 235 may correspond to host OS 120 of FIG. 1. In some implementations, processing device 201 may be operatively coupled to the memory 203 to additionally execute a hypervisor (not pictured), such as hypervisor 125 of FIG. 1. In some implementations, processing device 201 and memory 203 may correspond to processing device 602 and main memory 604 respectively as described below with respect to FIG. 6.

Physical address randomizer 238 may include request processing module 241, data structure manager 242, random index generator 243, physical memory page selector 244, physical memory page mapping module 245, and memory write module 246. Alternatively, the functionality of one or more of include request processing module 241, data structure manager 242, random number generator 243, physical memory page selector 244, physical memory page mapping module 245, and memory write module 246 may be combined into a single module or divided into multiple submodules.

Request processing module 242 is responsible for receiving a request to allocate a physical memory page to an address of an application. In some implementations, the request may be a specific request made by the application to allocate memory. Alternatively, request processing module 241 may receive the request by detecting a page fault generated by the application responsive to an attempt by that application to access a virtual memory address that is associated with that application's memory space.

In various implementations, data structure manager 242 may be invoked to maintain a data structure that stores references to physical memory pages that are available to be allocated (free memory pages). In one embodiment, the data structure may be a list of references to available physical memory pages (e.g., a "free list"). As noted above, the list may be organized such that each item on the list has an identifier and includes a reference address location to the corresponding available physical memory page.

In an illustrative example, when an attempted memory access has been detected, random index generator 243 may be invoked to generate a random (or pseudo-random) index into the data structure that stores the references to the available physical memory pages (the free list). In some implementations, the random index may correspond to a reference for one of the available physical memory pages in the data structure. For example, where the data structure is a list as described above, random index generator 243 may generate a random (or pseudo-random) number that corresponds to an item on the list.

As noted above, random index generator 243 may be invoked each time an attempted memory access is detected by an application. Alternatively, random index generator 243 may be invoked during initialization (e.g., startup) of the application rather than for each memory access. In some implementations, random index generator 243 may be invoked during initialization (e.g., startup) of operating system 235 to generate a random index that may be used for any application that attempts a memory access. In other implementations, random index generator 243 may be invoked periodically to refresh the random index after a period of time. For example, a timer may be started to expire after a particular time period (a number of seconds, a number of minutes, etc.). Responsive to determining that the timer has expired, random index generator 243 may be invoked to generate the random index.

In some implementations, available physical memory may be apportioned across multiple physical processors (e.g., CPUs). In such cases, a separate data structure may be maintained by data structure manager 242 for each physical processor to manage the free list of available physical memory pages for the corresponding physical processor. When operating system 235 apportions physical memory to a physical processor (e.g., at operating system startup, when the number of available physical memory pages reaches a low threshold, etc.) data structure manager 242 may be invoked to identify the apportioned physical memory pages for the physical process and store references to the physical memory pages in the data structure for that physical processor.

In some implementations, upon receiving the request to allocate a physical memory page to the address space of an application, request processing module 241 may determine that the application is associated with a particular physical processor. Random index generator 243 may be invoked to generate the random index into the data structure for that physical processor. Random index generator 243 may use any of the methods described above to generate the random index. Alternatively, random index generator 243 may be invoked at the time physical memory pages are apportioned to the physical processors from a larger pool of physical memory. This may occur during startup of operating system 235, when the amount of available physical memory pages for a particular physical processor meets a low threshold (e.g., the physical processor is low on available physical memory pages), or the like. Responsive to storing the references to the apportioned physical memory pages in the data structure for the physical processor, random index generator 243 may be invoked to generate the random index.

Physical memory page selector 244 may then be invoked to select a physical memory page from the data structure using the random index. In implementations where the data structure is a list of references to available physical memory pages, the random index may represent an item number in the list. Physical memory page selector 244 may use the random index to select the corresponding item number. For example, if the data structure is a list that includes references to ten available physical memory pages, the list should contain ten items (one list item per available memory page). If random index generator 243 generates a random index of five, then physical memory page selector 244 may select the fifth item from the list of available physical memory pages.

Once a physical memory page has been selected, physical memory page mapping module 245 may then be invoked to map the selected physical memory page to the address space of the application. Physical memory page mapping module 245 may then remove the reference to the mapped physical memory page from the data structure (e.g., remove the corresponding item from the physical memory page free list). For example, continuing the example above where the fifth item from the list is selected, and its corresponding physical memory page mapped to the application memory space, physical memory mapping module 245 may delete the fifth item from the list and adjust the list accordingly.

In some implementations, memory write module 246 may be subsequently invoked when a request is received from an application to write to the mapped physical memory page. Memory write module 246 may first encrypt the data in view of location information associated with the physical memory page. For example, memory write module 246 may use address information associated with the physical memory page as part of an encryption key or initialization vector for the data. Memory write module 246 may then write the data to the physical memory page.

In some implementations involving a virtualized environment, physical address randomizer 238 may be invoked by the operating system 235 of a host system that additionally includes a hypervisor (not pictured). In such cases, physical address randomizer 238 may function as described above to facilitate physical address randomization for memory access requests received from a virtual machine. Request processing module 241 may detect memory access attempts made by a virtual machine in addition to or rather than an application. The various components of physical address randomizer 238 may function as described above to randomly select an available physical memory page. In some implementations, random index generator 243 may be invoked to generate the random index when the hypervisor initializes, when the virtual machine initializes, or by any of the methods described above. Subsequently, physical memory page mapping module 245 may then be invoked to map the selected physical memory page to the memory space of the virtual machine.

Figure 3:
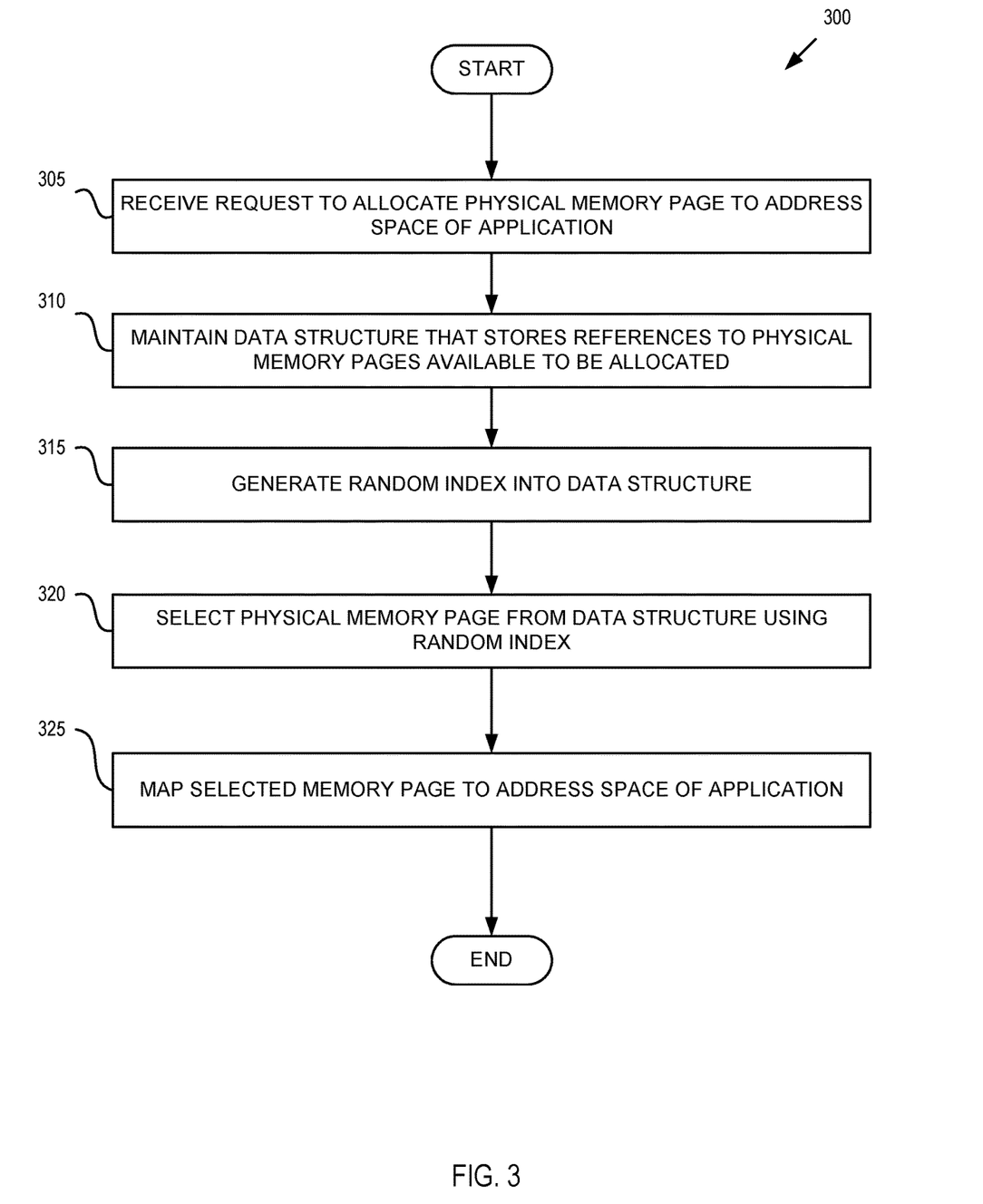
FIG. 3 depicts a flow diagram of a method for physical address randomization for an application by an operating system, in accordance with one or more aspects of the present disclosure.

FIG. 3 depicts a flow diagram of an example method 300 for physical address randomization for an application by an operating system. The method may be performed by processing logic that may comprise hardware (circuitry, dedicated logic, etc.), computer readable instructions (run on a general purpose computer system or a dedicated machine), or a combination of both. In one illustrative example, method 300 may be performed by physical address randomizer 122 in FIG. 1, and/or physical address randomizer 238 in FIG. 2. Alternatively, some or all of method 300 might be performed by another module or machine. It should be noted that blocks depicted in FIG. 3 could be performed simultaneously or in a different order than that depicted.

At block 305, processing logic receives a request to allocate a physical memory page to an address space of an application. In some implementations, by receiving the request, processing logic detects a page fault generated by the application responsive to an attempt by the application to access a virtual memory address associated with the application's address space. At block 310, processing logic maintains a data structure that stores references to a plurality of physical memory pages that are available to be allocated. At block 315, processing logic generates a random index into the data structure. In some implementations, the random index comprises a random number, and corresponds to a reference for a physical memory page of the plurality of physical memory pages. At block 320, processing logic selects a physical memory page from the data structure using the random index. At block 325, processing logic maps the selected physical memory page to the address space of the application. After block 325, the method of FIG. 3 terminates.

Figure 4:
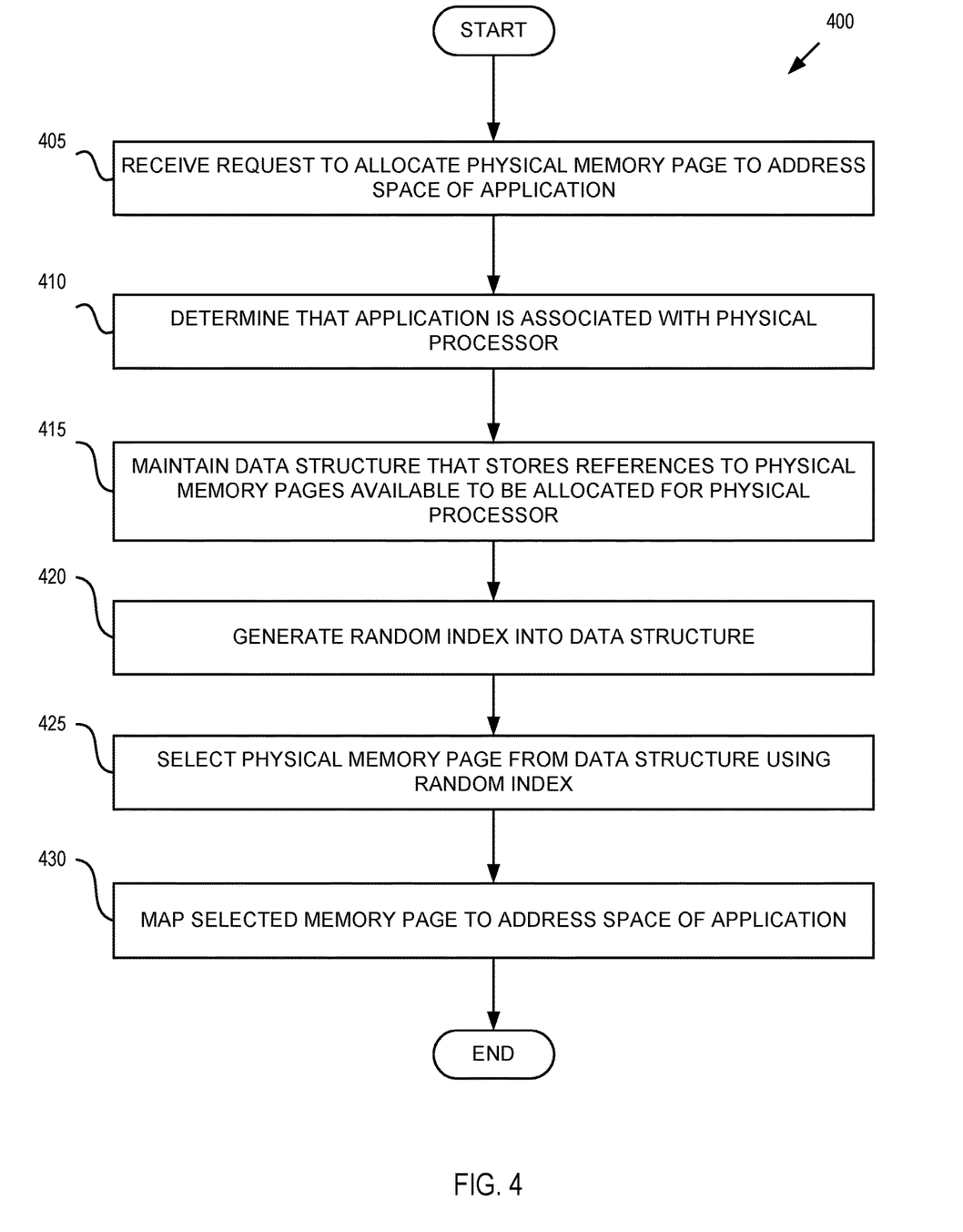
FIG. 4 depicts a flow diagram of another method for physical address randomization for an application by an operating system, in accordance with one or more aspects of the present disclosure.

FIG. 4 depicts a flow diagram of an example method 400 for physical address randomization for an application by an operating system. The method may be performed by processing logic that may comprise hardware (circuitry, dedicated logic, etc.), computer readable instructions (run on a general purpose computer system or a dedicated machine), or a combination of both. In one illustrative example, method 400 may be performed by physical address randomizer 122 in FIG. 1, and/or physical address randomizer 238 in FIG. 2. Alternatively, some or all of method 400 might be performed by another module or machine. It should be noted that blocks depicted in FIG. 4 could be performed simultaneously or in a different order than that depicted.

At block 405, processing logic receives a request to allocate a physical memory page to an address space of an application. In some implementations, by receiving the request, processing logic detects a page fault generated by the application responsive to an attempt by the application to access a virtual memory address associated with the application's address space. At block 410, processing logic determines that the application is associated with a physical processor. At block 415, processing logic maintains a data structure that stores references to a plurality of physical memory pages that are available to be allocated for the physical processor.

At block 420, processing logic generates a random index into the data structure. In some implementations, the random index comprises a random number, and corresponds to a reference for a physical memory page of the plurality of physical memory pages. At block 425, processing logic selects a physical memory page from the data structure using the random index. At block 430, processing logic maps the selected physical memory page to the address space of the application. After block 430, the method of FIG. 4 terminates.

Figure 5:
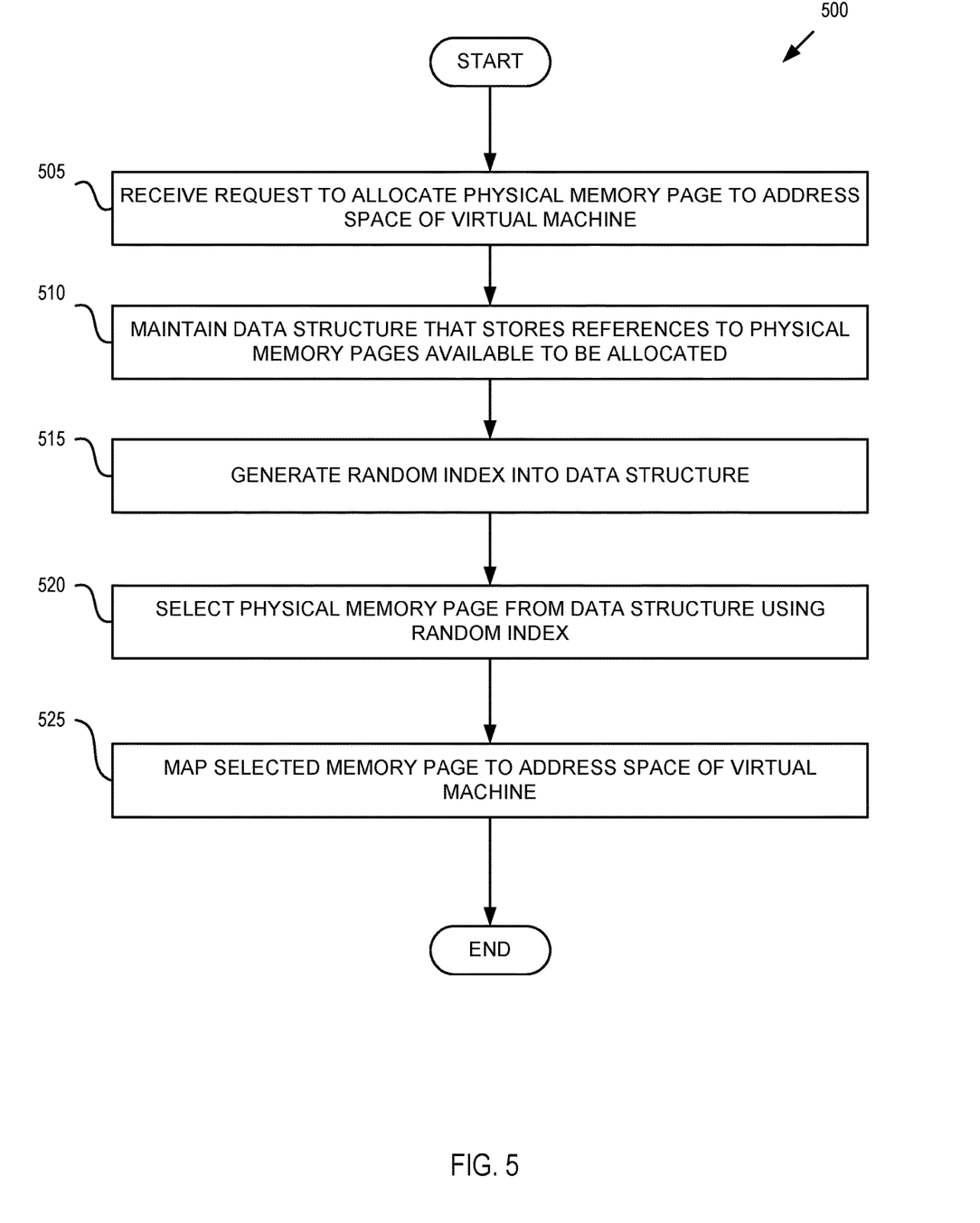
FIG. 5 depicts a flow diagram of a method for physical address randomization for a virtual machine by a hypervisor, in accordance with one or more aspects of the present disclosure.

FIG. 5 depicts a flow diagram of an example method 500 for physical address randomization for a virtual machine by a hypervisor. The method may be performed by processing logic that may comprise hardware (circuitry, dedicated logic, etc.), computer readable instructions (run on a general purpose computer system or a dedicated machine), or a combination of both. In one illustrative example, method 500 may be performed by physical address randomizer 128 of hypervisor 125 in FIG. 1 and/or physical address randomizer 238 in FIG. 2. Alternatively, some or all of method 500 might be performed by another module or machine. It should be noted that blocks depicted in FIG. 5 could be performed simultaneously or in a different order than that depicted.

At block 505, processing logic receives a request to allocate a physical memory page to an address space of a virtual machine. In some implementations, by receiving the request, processing logic detects a page fault generated by the virtual machine responsive to an attempt by the virtual machine to access a virtual memory address associated with the virtual machine's address space. At block 510, processing logic maintains a data structure that stores references to a plurality of physical memory pages that are available to be allocated.

At block 515, processing logic generates a random index into the data structure. In some implementations, the random index comprises a random number, and corresponds to a reference for a physical memory page of the plurality of physical memory pages. At block 520, processing logic selects a physical memory page from the data structure using the random index. At block 525, processing logic maps the selected physical memory page to the address space of the virtual machine. After block 525, the method of FIG. 5 terminates.

Figure 6:
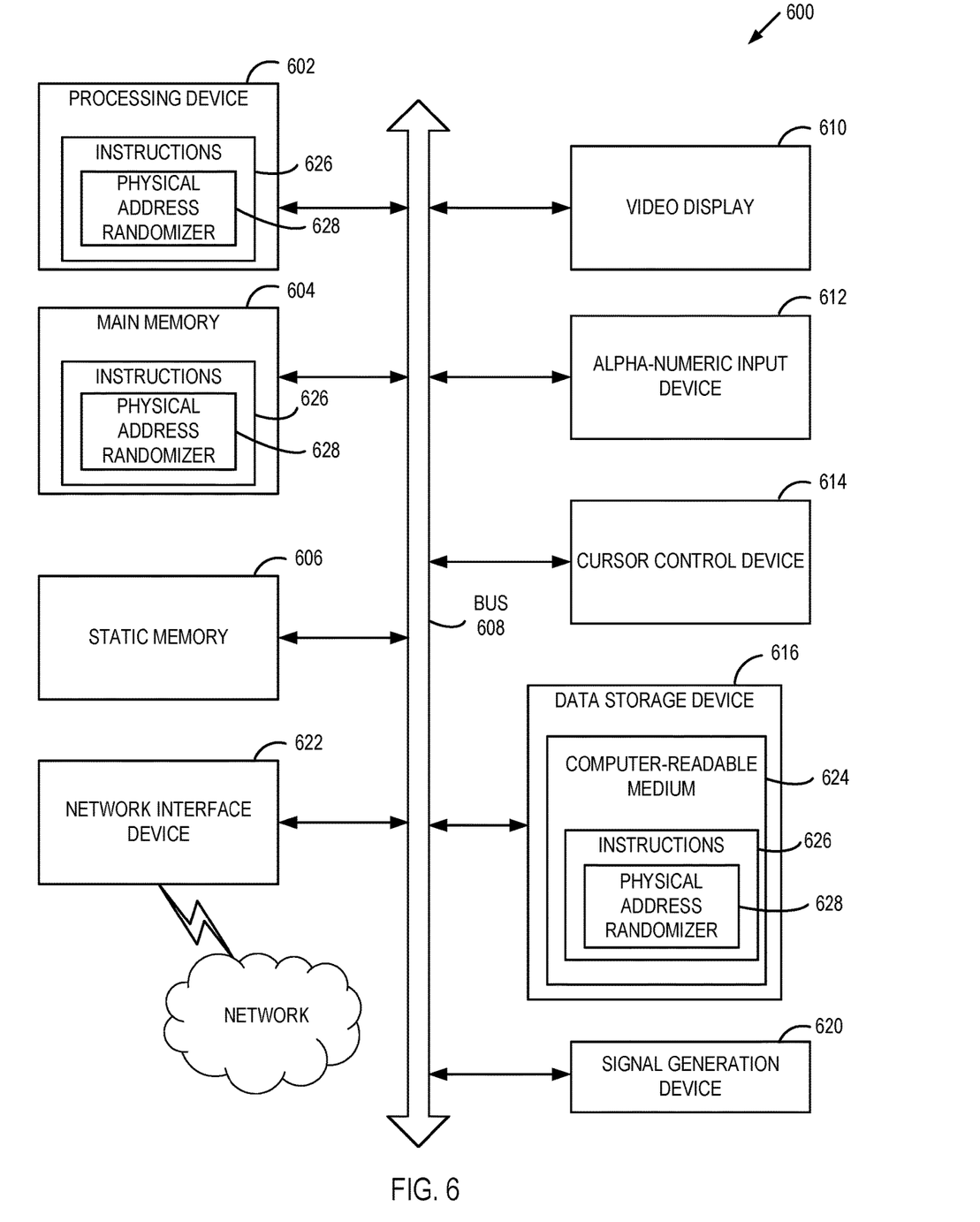
FIG. 6 depicts a block diagram of an illustrative computer system operating in accordance with one or more aspects of the present disclosure.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes physical address randomizer 628 for performing the operations and steps discussed herein (e.g., corresponding to the methods of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include physical address randomizer 628 (e.g., corresponding to the methods of FIGS. 3-5, etc.) embodying any one or more of the methodologies or functions described herein. Physical address randomizer 628 may also reside, completely or at least partially, within the main memory 604 and/or within the processing device 602 during execution thereof by the computer system 600, the main memory 604 and the processing device 602 also constituting computer-readable media. Physical address randomizer 628 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "maintaining," "generating," "selecting," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method, comprising:
maintaining, by a computing device executing an operating system, a first data structure that stores references to a first plurality of physical memory pages that are available to be allocated to a first processor, and a second data structure that stores references to a second plurality of physical memory pages that are available to be allocated to a second processor and;
detecting, by the computing device, a page fault generated in response to an attempt by an application to access a virtual memory address associated with a memory address space of the application;
determining, responsive to detecting the page fault, whether the application has been executed on the first processor or the second processor;
invoking, by the computing device, responsive to determining that the application has been executed on the first processor, a random index generator to generate a random index into the first data structure, wherein the random index comprises a random number, and wherein the random index corresponds to a first reference for a first physical memory page of the first plurality of physical memory pages;
selecting, by the computing device, the first physical memory page of the first plurality of physical memory pages from the first data structure using the random index; and
mapping the first physical memory page to the memory address space of the application.

2. The method of claim 1, wherein the application is a virtual machine application.

3. The method of claim 1, wherein generating the random index comprises generating a random number that corresponds to an item in the first data structure.

4. The method of claim 1, wherein the random index is generated when the operating system initializes.

5. The method of claim 1, wherein the random index is generated when the application initializes.

6. The method of claim 1, wherein the random index is generated when the page fault is detected.

7. The method of claim 1, wherein generating the random index comprises:
starting a timer to expire after a first time period; and
responsive to determining that the first time period has expired, generating the random index.

8. The method of claim 1, further comprising:
removing a reference to the first physical memory page from the first data structure.

9. The method of claim 1, further comprising:
receiving a request from the application to write data to the first physical memory page;
encrypting the data in view of location information associated with the first physical memory page to generate an encrypted data; and
writing the encrypted data to the first physical memory page.

10. A system comprising:
a memory;
a computing device, operatively coupled to the memory, wherein the computing device comprises a first processor and a second processor, and wherein the computing device is to execute an operating system to:
maintain a first data structure that stores references to a first plurality of physical memory pages that are available to be allocated, wherein the first plurality of physical memory pages is apportioned to the first processor;
maintain a second data structure that stores references to a second plurality of physical memory pages that are available to be allocated, wherein the second plurality of physical memory pages is apportioned to the second processor;
receive a request to allocate a physical memory page to an address space of an application;
determine, responsive to receiving the request to allocate the physical memory page, whether the application has been executed on the first processor or the second processor;
generate, responsive to determining that the application has been executed on the first processor, a random index into the first data structure, wherein the random index comprises a random number, and wherein the random index corresponds to a first reference for a first physical memory page of the first plurality of physical memory pages;
select, by the computing device executing the operating system, the first physical memory page of the first plurality of physical memory pages from the first data structure using the random index; and
map the first physical memory page to the address space of the application.

11. The system of claim 10, wherein to receive the request, the computing device is to:
detect a page fault generated by the application responsive to an attempt by the application to access a virtual memory address associated with the address space of the application.

12. The system of claim 10, wherein the first data structure comprises a list of references to available physical memory pages associated with the first processor, and wherein to generate the random index, the computing device is to generate a random number that corresponds to an item on the list of references.

13. The system of claim 10, wherein the random index is generated when the operating system initializes.

14. The system of claim 10, wherein to maintain the first data structure, the computing device is to:
identify the first plurality of physical memory pages for the first processor;
store the references to the first plurality of physical memory pages in the first data structure; and
remove, responsive to selecting the first physical memory page, the reference to the first physical memory page from the first data structure.

15. The system of claim 10, wherein to generate the random index, the computing device is to:
start a timer to expire after a first time period; and
responsive to determining that the first time period has expired, generate the random index.

16. A non-transitory computer readable storage medium, having instructions stored therein, which when executed by a computing device, cause the computing device to execute a hypervisor to:
maintain a first data structure that stores references to a first plurality of physical memory pages that are available to be allocated to a first processor, and a second data structure that stores references to a second plurality of physical memory pages that are available to be allocated to a second processor and;

detect a page fault generated in response to an attempt by an application to access a virtual memory address associated with a memory address space of a virtual machine;

determining, responsive to detecting the page fault, whether the application has been executed on the first processor or the second processor;

invoke, responsive to determining that the application has been executed on the first processor, a random index generator to generate a random index into the first data structure, wherein the random index comprises a random number, and wherein the random index corresponds to a first reference for a first physical memory page of the first plurality of physical memory pages;

select the first physical memory page of the first plurality of physical memory pages from the first data structure using the random index; and map the first physical memory page to the memory address space of the virtual machine.

17. The non-transitory computer readable storage medium of claim 16, wherein the application is a virtual machine application.

18. The non-transitory computer readable storage medium of claim 16, wherein to generate the random index the hypervisor is to generate a random number that corresponds to an item in the first data structure.

19. The non-transitory computer readable storage medium of claim 16, wherein the random index is generated when the hypervisor initializes.

20. The non-transitory computer readable storage medium of claim 16, wherein the random index is generated when the virtual machine initializes.

* * * * *